United States Patent
Lee et al.

(10) Patent No.: US 9,086,004 B2
(45) Date of Patent: Jul. 21, 2015

(54) SYSTEM AND METHOD FOR ACTIVE REGENERATION OF A DPF OF A CONSTRUCTION MACHINE HAVING AN ELECTRO-HYDRAULIC PUMP

(75) Inventors: Bong Jin Lee, Incheon (KR); Yong Ho Tho, Seoul (KR); Ho Sung Kim, Gyeonggi-do (KR)

(73) Assignee: Doosan Infracore Co., Ltd., Incheon (KR)

( * ) Notice: Subject to any disclaimer, the term of this patent is extended or adjusted under 35 U.S.C. 154(b) by 211 days.

(21) Appl. No.: 13/997,536

(22) PCT Filed: Dec. 26, 2011

(86) PCT No.: PCT/KR2011/010103
§ 371 (c)(1),
(2), (4) Date: Aug. 29, 2013

(87) PCT Pub. No.: WO2012/087082
PCT Pub. Date: Jun. 28, 2012

(65) Prior Publication Data
US 2013/0333355 A1    Dec. 19, 2013

(30) Foreign Application Priority Data
Dec. 24, 2010  (KR) ........................ 10-2010-0134627

(51) Int. Cl.
*F01N 3/00* (2006.01)
*F01N 3/02* (2006.01)
(Continued)

(52) U.S. Cl.
CPC ............... *F01N 3/023* (2013.01); *B60W 10/30* (2013.01); *F01N 3/0253* (2013.01); *F01N 3/035* (2013.01);*F01N 3/106* (2013.01); *F01N 9/002* (2013.01); *F02D 41/029* (2013.01); *B60Y 2300/476* (2013.01); *Y02T 10/47* (2013.01)

(58) Field of Classification Search
USPC .................... 60/274, 286, 295, 297, 303, 311
See application file for complete search history.

(56) References Cited

U.S. PATENT DOCUMENTS 7,340,884 B2 *  3/2008  Matsuno et al. ................. 60/295
7,484,360 B2 *  2/2009  Tominaga ....................... 60/295
(Continued)

FOREIGN PATENT DOCUMENTS

| EP | 2187012 A2 | 5/2010 |
| EP | 2208872 A1 | 7/2010 |
| WO | 2010-024012 A1 | 3/2010 |

OTHER PUBLICATIONS

Search Report dated Jul. 30, 2012 and written in Korean with English translation attached for International Patent Application No. PCT/KR2011/010103 filed Dec. 26, 2011, 5 pages.

*Primary Examiner* — Thomas Denion
*Assistant Examiner* — Diem Tran
(74) *Attorney, Agent, or Firm* — John D. Veldhuis-Kroeze; Westman, Champlin & Koehler, P.A.

(57) ABSTRACT

An exemplary embodiment of the present disclosure relates to a system for active regeneration of a DPF of a diesel engine, and more particularly, to a system and a method for active regeneration of a DPF including an electro-hydraulic pump, in which a non-work load is arbitrarily provided to the diesel engine to quickly perform active regeneration of the DPF even in a state in which substantial work of the construction machine having an electro-hydraulic pump is stopped, and to this end, provides a system and a method for active regeneration of a DPF of a construction machine in that, when performing the active regeneration of the DPF, a center bypass cut valve is driven to convert a hydraulic system of the construction machine to an open state, a predetermined flow rate of working fluid is discharged from the electro-hydraulic pump using an adjustor such as an electromagnetic proportional control valve (EPPR), and the working fluid is collected in to a tank through an opened center bypass line, thus allowing the working fluid to flow without driving a working machine to produce a so-called non-work load, and the engine is overheated by the load, and the temperature of the exhaust gas is raised to a predetermined temperature so as to satisfy a temperature condition required for the active regeneration of the DPF.

9 Claims, 4 Drawing Sheets

(51) Int. Cl.
*F01N 3/023* (2006.01)
*F01N 3/025* (2006.01)
*F01N 3/035* (2006.01)
*F01N 3/10* (2006.01)
*F01N 9/00* (2006.01)
*F02D 41/02* (2006.01)
*B60W 10/30* (2006.01)

(56) References Cited

U.S. PATENT DOCUMENTS

| 7,614,218 | B2* | 11/2009 | Akagawa | 60/295 |
| 7,845,165 | B2* | 12/2010 | Satou et al. | 60/295 |
| 8,209,962 | B2* | 7/2012 | Sun et al. | 60/295 |
| 2010/0126145 | A1 | 5/2010 | He et al. | |

* cited by examiner

SYSTEM AND METHOD FOR ACTIVE REGENERATION OF A DPF OF A CONSTRUCTION MACHINE HAVING AN ELECTRO-HYDRAULIC PUMP

CROSS-REFERENCE TO RELATED APPLICATION

This Application is a Section 371 National Stage Application of International Application No. PCT/KR2011/010103, filed Dec. 26, 2011 and published, not in English, as WO2012/087082 on Jun. 28, 2012.

FIELD OF THE DISCLOSURE

The present disclosure relates to a system for active regeneration of a DPF of a diesel engine, and more particularly, to a system and a method for active regeneration of a DPF, in which a non-work load is arbitrarily provided to the diesel engine to quickly perform active regeneration of the DPF even in a state in which substantial work of the construction machine having an electro-hydraulic pump is stopped.

BACKGROUND OF THE DISCLOSURE

A diesel engine used in a construction machine is required to satisfy various regulations and standards. One of the standards requires contaminants such as nitrogen oxides (NOx) and particulate matters (PM) contained in exhaust gas to be reduced, and this standard may be a major environmental standard together with a regulation in respect to noise when using the construction machine.

In order to satisfy the environmental standard, for example, the Tier-4i exhaust regulation, the present applicant uses a diesel engine to which various means such as an exhaust gas recirculation (EGR) apparatus, and a diesel particulate filter (DPF) apparatus are applied.

Here, the diesel particulate filter (DPF) indicates a filter, which is disposed on a path through which exhaust gas discharged from the diesel engine is discharged, and may trap and filter particulates (soot) that are particulate matters including, for example, soot in a muffler, and when an amount of trapped particulates becomes a predetermined level or more, there are problems in that back pressure becomes higher, and performance of the filter deteriorates.

Therefore, this filter needs a process of arbitrarily removing particulates trapped in the filter periodically or in accordance with the trapped amount, and this is typically referred to as a 'DPF regeneration' or 'combustion removal'.

The regeneration may be classified into passive regeneration and active regeneration in accordance with an implementation method thereof. Particularly, the active regeneration of the DPF refers to a manner in which an operator forcibly drives an engine of the construction machine to discharge high-temperature exhaust gas without substantially performing work, and a small amount of fuel, which is supplied to an exhaust path, causes an exothermic reaction with a diesel oxidation catalyst (DOC), which is also disposed on the exhaust path in advance, based on the temperature of the exhaust gas so as to raise the temperature of the exhaust gas to a higher temperature that is required to combust (regenerate) particulates, thereby combusting particulates trapped in the filter.

Typically, the engine discharges the exhaust gas having a higher temperature when the engine is driven by receiving a load rather than when the engine is in an idle drive state. However, unlike the passive regeneration, in a case of the active regeneration, because the engine is driven in a substantial non-load state (idle state) in a state in which the construction machine is stopped, a considerably long period of time is required to raise a temperature of the exhaust gas up to a predetermined temperature that is needed to enable the exothermic reaction of the DOC. Therefore, for example, a procedure of forcibly controlling a pump needs to be performed so as for the pump to discharge the working fluid so as to produce so-called a 'non-work load' in order to apply a load to the engine without performing work.

Figure 1:
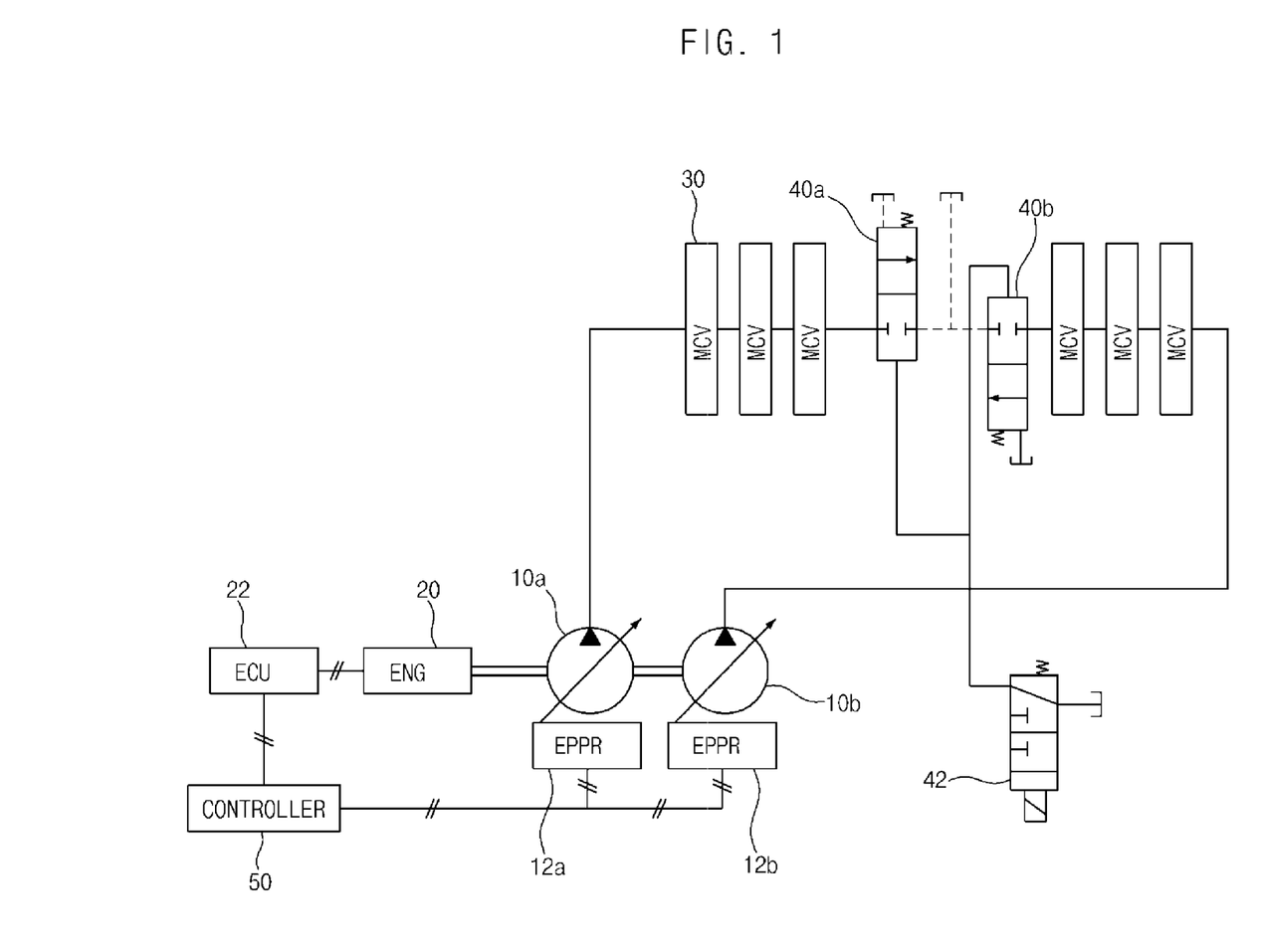
FIG. 1 is a view simply illustrating a typical hydraulic circuit diagram including an electro-hydraulic pump.

Meanwhile, recently, a construction machine is being developed which includes an electro-hydraulic pump that is driven by receiving an electronic control signal instead of the existing hydraulic signal. For example, FIG. 1 illustrates an example of a hydraulic circuit diagram of a structure including the electro-hydraulic pump. For reference, in a hydraulic system of FIG. 1, details in respect to elements such as a pilot line through which an operation of an operator is transmitted, a working machine which performs actual work, and the like are omitted.

Referring to FIG. 1, the construction machine includes electro-hydraulic pumps 10a and 10b that are driven by a diesel engine 20, a discharge flow rate of the electro-hydraulic pumps 10a and 10b may be adjusted by receiving an electronic control signal (for example, current signal) that is transmitted from a controller 50, for example, through adjustors 12a and 12b such as an electromagnetic proportional control valve (EPPR). In addition, the working fluid discharged from the electro-hydraulic pumps 10a and 10b is supplied to a plurality of working machines (not illustrated) and the like through a plurality of main control valves (MCV) 30 to drive the working machines. In addition, the diesel engine 20 is controlled by an engine control unit (ECU) 22.

Recently, as illustrated in FIG. 1, in order to improve fuel efficiency and work efficiency, development on a construction machine including a hydraulic circuit having a hermetic structure is being actively conducted. For example, the hydraulic circuit having the hermetic structure includes center bypass cut valves 40a and 40b that correspond to the respective electro-hydraulic pumps 10a and 10b, and a center bypass cut solenoid valve 42 that controls operations of the center bypass cut valves 40a and 40b, and the hydraulic circuit is maintained in a hermetic state in a state in which the center bypass cut valves 40a and 40b are closed.

As such, in a case of the construction machine configured as the hermetic system, because only torque (a function of pressure and a flow rate in the hydraulic pump), which is required by a user, is basically produced, torque generated in the diesel engine in an idle state is theoretically close to "0".

Therefore, in spite of the hermetic system, in order to perform active regeneration of the DPF in a case of the construction machine having the electro-hydraulic pump, means need to be sought which may produce so-called a non-work load by discharging the working fluid while the electro-hydraulic pump does not drive the working machine.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

An aspect of the present disclosure is to provide a system and a method for implementing active regeneration of a DPF in respect to a construction machine having an electro-hydraulic pump.

Another aspect of the present disclosure is that a diesel engine quickly discharges high-temperature exhaust gas when receiving a non-work load such that the high-temperature exhaust gas causes an exothermic reaction with a DOC so as to combust particulates trapped in a DPF.

Yet another aspect of the present disclosure is to provide a system and a method for active regeneration of a DPF, which may minimize an amount of fuel that is consumed in respect to the active regeneration by quickly performing the active regeneration of the DPF.

An exemplary embodiment of the present disclosure provides a system for active regeneration of a DPF of a construction machine having an electro-hydraulic pump, the system including: a diesel engine; electro-hydraulic pumps driven by the diesel engine and of which a discharge flow rate is adjusted by a current control of a controller; a plurality of working machines driven by working fluid discharged from the electro-hydraulic pumps; a center bypass line having one end connected to the electro-hydraulic pumps, and the other end connected to a tank, so that the working fluid discharged from the electro-hydraulic pumps returns back to the tank when the plurality of working machine is not driven; center bypass cut valves which selectively block connection between the center bypass line and the tank; a diesel particulate filter (DPF) which filters contaminants from exhaust gas discharged from the diesel engine; and a DPF regeneration means including a diesel oxidation catalyst (DOC) which causes an exothermic reaction with fuel at a predetermined temperature, in which the controller produces a non-work load by increasing a discharge flow rate of the electro-hydraulic pumps without driving the working machines in a state in which the center bypass line is connected to the tank by driving the center bypass cut valves when performing active regeneration of the DPF, and allows a temperature of the exhaust gas to be increased up to the predetermined temperature by increasing a heating value of the diesel engine by the non-work load.

In addition, in an exemplary embodiment of the present disclosure, the hydraulic system may further include a safety cut-off valve which is disposed on a path which transmits pilot pressure which instructs a drive of each of the working machines, and configured to block the transmission of the pilot pressure when the safety cut-off valve is operated, and the safety cut-off valve may be operated when the regeneration of the DPF starts so as to block the transmission of the pilot pressure, and may be released after the regeneration of the DPF is completed so as to enable the transmission of the pilot pressure.

In addition, in an exemplary embodiment of the present disclosure, a discharge flow rate of the electro-hydraulic pumps may be controlled based on a control current received through electromagnetic proportional control valves (EPPR).

In addition, another exemplary embodiment of the present disclosure provides a method for active regeneration of a DPF of a construction machine having an electro-hydraulic pump in the system for active regeneration of the DPF of the aforementioned exemplary embodiment, the method including: a) receiving instruction on the active regeneration of the DPF; b) adjusting the electro-hydraulic pump so that the corresponding electro-hydraulic pump discharges the working fluid at a predetermined flow rate by opening the system by driving the center bypass cut valve, and providing an arbitrary control current to the electromagnetic proportional control valve (EPPR); c) overheating the diesel engine by a non-work load generated by the discharge of the working fluid from the electro-hydraulic pump; and d) performing the active regeneration of the DPF by causing an exothermic reaction by supplying fuel to a diesel oxidation catalyst (DOC) disposed on a path through which the exhaust gas heated to a predetermined temperature is discharged.

In addition, in the method of an exemplary embodiment of the present disclosure, the system for active regeneration of the DPF may include a main control valve which is driven according to transmission of a work instruction of an operator, and drives each of the working machines, and step b) may be performed only when the work instruction, which is transmitted to the main control valve, is in a state of being blocked.

According to an exemplary embodiment of the present disclosure, the system and the method for implementing active regeneration of the DPF may be provided to the construction machine having the electro-hydraulic pump.

In addition, according to an exemplary embodiment of the present disclosure, the diesel engine quickly discharges high-temperature exhaust gas by receiving a non-work load such that the high-temperature exhaust gas causes an exothermic reaction with the DOC so as to combust particulates trapped in the DPF.

In addition, according to an exemplary embodiment of the present disclosure, the active regeneration of the DPF is quickly implemented such that an amount of fuel, which is consumed in respect to the active regeneration, may be minimized.

DESCRIPTION OF MAIN REFERENCE NUMERALS OF DRAWINGS

100: System
10a, 10b: Electro-hydraulic pump
12a, 12b: Electromagnetic proportional control valve (EPPR), Adjustor
20: Diesel engine
22: Engine control unit (ECU)
24: Exhaust path
30: Main control valve (MCV)
40a, 40b: Center bypass cut valve
42: Center bypass cut solenoid valve
50: Controller
60: Lever
62: Safety cut-off valve
70: Diesel particulate filter (DPF)
72: Diesel oxidation catalyst (DOC)
74: Fuel supply means
80: Center bypass line
S: Active regeneration switch

DETAILED DESCRIPTION

Hereinafter, a preferred exemplary embodiment of the present disclosure will be described with reference to the accompanying drawings.

Figure 2:
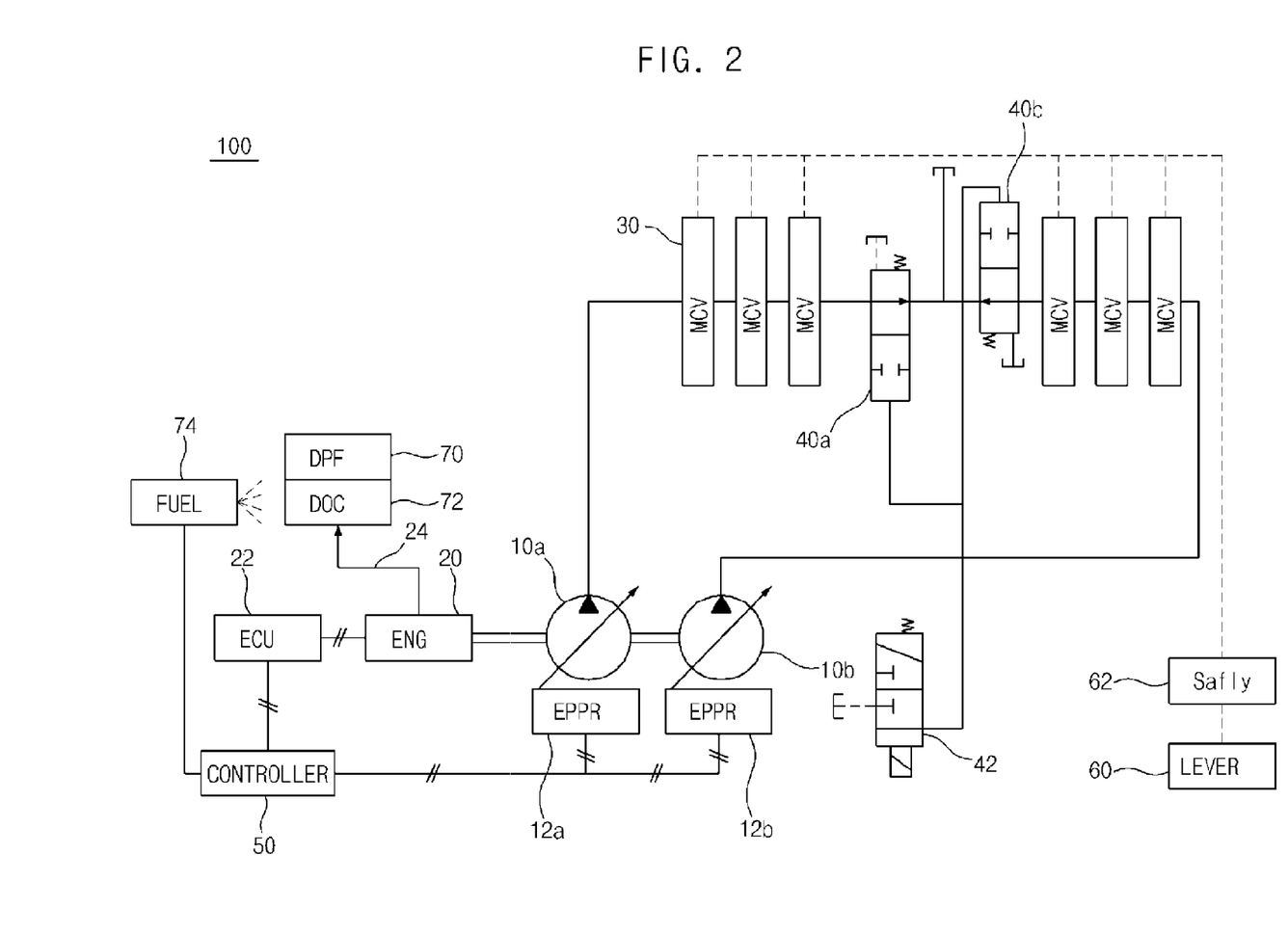
FIG. 2 is a view simply illustrating a system for active regeneration of a DPF according to an exemplary embodiment of the present disclosure.

FIG. 2 is a view simply illustrating a system for active regeneration of a DPF according to an exemplary embodiment of the present disclosure. Referring to FIG. 2, a hydraulic circuit of a construction machine used in an exemplary embodiment of the present disclosure will be simply described as follows.

The construction machine of the present exemplary embodiment includes electro-hydraulic pumps 10a and 10b. The electro-hydraulic pumps 10a and 10b, for example, may adjust a flow rate of discharged fluid by adjusting an angle of a swash plate using adjustors 12a and 12b such as an electromagnetic proportional control valve (EPPR). The electromagnetic proportional control valve (EPPR) may adjust an angle of a swash plate inside a pump by receiving a current signal (electronic control signal) from a controller 50.

Working fluid discharged from the electro-hydraulic pumps 10a and 10b is supplied to a plurality of main control valves (MCV) 30 through a center bypass line 80 and a plurality of parallel lines (not illustrated in FIG. 2), and a flow of the working fluid supplied to the plurality of main control valves 30 is controlled by each of the main control valves 30 such that the working fluid is supplied to an individual working machine (not illustrated) corresponding to each of the main control valves 30, and drives the corresponding working machine. The working machine may include a front working machine such as a boom, an arm, and a bucket, driving/steering means such as a driving pump, and a turning pump, and cooling means such as a fan.

In addition, center bypass cut valves 40a and 40b, which may be driven by a center bypass cut solenoid valve 42, are provided. In a typical case, a hydraulic system including the electro-hydraulic pumps 10a and 10b is driven in a state in which the center bypass cut valves 40a and 40b are closed. One end of the center bypass line 80 is connected to discharge parts of the electro-hydraulic pumps 10a and 10b, and the other end thereof is connected to a tank via the main control valves 30. Accordingly, when the individual working machine is not driven, the working fluid discharged from the electro-hydraulic pumps 10a and 10b returns back to the tank. The center bypass cut valves 40a and 40b are installed at an end portion of the other end of the center bypass line 80. In general, the hydraulic system in the exemplary embodiment of the present disclosure is driven in a state in which the center bypass line 80 is closed, that is, driven as a hermetic system. Therefore, the electro-hydraulic pumps 10a and 10b in this system are controlled so as to discharge the working fluid by only an amount that is required for each working machine.

Meanwhile, the center bypass cut valves 40a and 40b are generally operated in only a specific case to open the system. For example, in only a specific case such as a case in which a problem occurs as a load of an engine 20 is rapidly increased when the construction machine is started, the center bypass cut valves 40a and 40b are operated to open the system.

Further, an operator operates a lever 60 in a cockpit such that a work instruction of the operator may be transmitted to the main control valves 30 and the adjustors 12a and 12b in the form of a hydraulic signal or an electrical signal. The flow rate of the electro-hydraulic pumps 10a and 10b may be adjusted corresponding to the work instruction of the operator, and the main control valves 30 are driven such that the working fluid may be supplied to the working machines. In a case of the present exemplary embodiment, a current signal is provided to the electro-hydraulic pumps 10a and 10b, and a pressure signal (not illustrated) is provided to each of the main control valves 30. In the present exemplary embodiment, a work instruction is outputted from the lever 60 to the controller 50, and the controller 50 controls the adjustors 12a and 12b again, thereby controlling discharge flow rates of the electro-hydraulic pumps 10a and 10b. Meanwhile, a signal corresponding to the work instruction from the lever 60 is transmitted via a safety cut-off valve 62, and the work instruction of the operator may be controlled to be or not to be transmitted in accordance with whether the safety cut-off valve 62 is operated. The safety cut-off valve 62 may be operated by a manual operation of the safety cut-off valve 62 or an operation of a separate switch (not illustrated in the drawing) by the operator, or may be controlled by the controller 50 so as to be operated in a specific condition.

In addition, the electro-hydraulic pumps 10a and 10b are connected to the diesel engine 20, and driven by receiving output of the diesel engine. For example, the diesel engine 20 is controlled by an engine control unit (ECU) 22, and exhaust gas is discharged to the outside along an exhaust path 24 produced when the diesel engine 20 is operated.

A diesel particulate filter (DPF) 70 and a diesel oxidation catalyst (DOC) 72, which is provided at a front end of the diesel particulate filter (DPF) 70, are disposed on the exhaust path 24, and a fuel supply means 74, which may supply fuel to the diesel oxidation catalyst 72, is also disposed on the exhaust path 24. A series of devices including the diesel particulate filter 70, the diesel oxidation catalyst 72, and the fuel supply means 74 are referred to as 'after treatment means' or 'DPF regeneration means' against exhaust gas.

For example, contaminants such as particulate matters (PM) contained in exhaust gas may be filtered by the diesel particulate filter 70, and then the trapped particulates or the like after the filtering may be removed by being combusted by an exothermic reaction of the diesel oxidation catalyst. High-temperature exhaust gas is required as a temperature condition for the exothermic reaction.

In this system, a process of implementing active regeneration of the DPF will be arranged as follows. For example, as a precondition for active regeneration of the DPF, the following two conditions need to be satisfied. First, in order to prevent an operation signal (for example, a hydraulic signal) from the lever 60 in the cockpit from being transmitted to each of the main control valves 30, the safety cut-off valve 62 needs to be driven in an OFF state. In addition, an active regeneration instruction (for example, may be implemented by an active regeneration switch S) from the operator in respect to a start of active regeneration of the DPF needs to be present.

For example, in the process of active regeneration of the DPF of the present exemplary embodiment, an arbitrary load, for example, a non-work load is generated at the electro-hydraulic pumps 10a and 10b by a control current supplied to the electromagnetic proportional control valves 12a and 12b, and thereby the engine is maintained in an overheated state. In this state, the lever 60 may be operated by a mistake or an erroneous of the operator, and thereby the corresponding work instruction (for example, hydraulic signal) may be transmitted to each of the main control valves, or the like. In this case, a sudden change in the engine may be caused such that a burden may affect the engine, and a safety accident may be caused as the working machine is suddenly driven regardless of the intention of the operator. Therefore, the safety cut-off valve 62 may be necessarily driven in an OFF state before the active regeneration of the DPF so as to prevent the work instruction by the lever 60 from being transmitted to the system, and may be driven in an ON state after the active regeneration of the DPF so that it is possible to typically transmit the work instruction using the lever 60. The operation of the safety cut-off valve 62 may be performed by a manual operation of the operator, or by an automatic control of the controller 50. In the present exemplary embodiment, a case in which the safety cut-off valve 62 is operated by a manual operation of the operator will be described as an example. If the controller 50 receives, as an electronic signal, a work signal corresponding to an operation of the lever 60 by the operator, and the controller 50 controls the main control valves 30 corresponding to the above operations, the safety cut-off valve 62 may be omitted. In this case, it is preferred that the controller 50 controls the main control valves 30 so that the main control valves 30 are not operated, when the active regeneration of the DPF is selected.

Therefore, the active regeneration of the DPF of the present exemplary embodiment confirms, as a start condition, two conditions including driving of the safety cut-off valve in an OFF state, and an instruction of the operator on the active regeneration of the DPF.

In a state in which the start condition is confirmed, the active regeneration of the DPF of the present exemplary embodiment allows the electro-hydraulic pumps 10a and 10b to discharge the working fluid at an appropriate flow rate by applying an arbitrary control current to the electromagnetic proportional control valves (EPPR) 12a and 12b after converting the system to an open state by opening the center bypass cut valves 40a and 40b.

In the system of the present exemplary embodiment, because the system is in the open state as the center bypass cut valves 40a and 40b are driven, the working fluid discharged from the electro-hydraulic pumps 10a and 10b is not supplied to the working machine (for example, through each of the main control valves 30), but may be collected in the tank through the center bypass line.

As the electro-hydraulic pumps 10a and 10b discharge the working fluid at an appropriate flow rate, an arbitrary load, for example, a non-work load is produced, the diesel engine 20 is overheated while performing work by receiving the load, and thereby a temperature of exhaust gas discharged from the diesel engine 20 is increased.

When the temperature of exhaust gas is increased up to a predetermined temperature that is required for the active regeneration, fuel is supplied (dosing) to the DOC 72 disposed on the exhaust path by the fuel supply means 74 such that an exothermic reaction occurs between the fuel and the DOC, and thereby the exhaust gas is heated to a higher temperature such that particulates (soot) and the like trapped in the DPF 70 disposed at a rear end of the DOC 72 are removed by being combusted.

Although not illustrated, the ECU 22 may be connected to a temperature sensor for measuring temperatures of the diesel engine 20, the DPF 70, and the like, and a pressure sensor for measuring pressure at front and rear ends on the basis of the DPF 70, and may receive measurement values from the sensors. The ECU 22 may perform an appropriate control based on the received measurement values.

For example, by measuring a temperature of the DPF 70, it is possible to determine whether a temperature reaches the temperature that is required for the active regeneration of the DPF, or by measuring pressure at the front and rear ends of the DPF 70, it is possible to determine a size of back pressure applied to the DPF 70. In addition, the measurement values are transmitted to the controller 50, and may be utilized as a determination reference when the controller 50 outputs a control signal.

As a concept corresponding to the start condition for the active regeneration of the DPF, an end condition for the active regeneration of the DPF may be set. For example, the active regeneration of the DPF may end when the operator intentionally operates the active regeneration switch S to transmit an end instruction, or the ECU 22 of the engine receives a signal informing completion of the regeneration. For example, when the active regeneration of the DPF has been performed for a predetermined time, or back pressure applied to the DPF 70 is lowered down to a desired value or less, the ECU 22 receives the signal informing completion of the regeneration.

When the end condition is satisfied, the system is converted to a hermetic state by driving the center bypass cut valves 40a and 40b, and the control current with respect to the electromagnetic proportional control valves (EPPR) 20a and 20b is returned to a normal value and supplied. For example, the reception of the regeneration completion signal by the ECU may be an automatic end condition of the active regeneration of the DPF, and the end instruction by an operation of the operator may be a manual end condition of the active regeneration of the DPF. Thereafter, lastly, the safety cut-off valve 62 is driven in the ON state such that the operation signal of the lever 60 by the operator may be normally transmitted to, for example, each of the main control valves 30. That is, the system is returned to the system before the active regeneration of the DPF.

As described above, in the exemplary embodiment of the present disclosure in respect to the construction machine including the electro-hydraulic pump, the active regeneration of the DPF may be performed by applying an arbitrary control current to the electromagnetic proportional control valve (EPPR) that is an adjustor for converting the system to an open type by driving the center bypass cut valve, and for adjusting an angle of the swash plate in the electro-hydraulic pump such that the electro-hydraulic pump discharges the working fluid at a predetermined flow rate under the opened system. That is, the electro-hydraulic pump discharges the working fluid in a state in which the center bypass line 80 is opened such that a non-work load, which does not drive the working machine, may be produced, the diesel engine is overheated by this load so as to discharge the high-temperature exhaust gas, an exothermic reaction between the diesel oxidation catalyst (DOC) and fuel supplied thereto occurs by the high-temperature exhaust gas, and particulates (soot) and the like trapped in the DPF are combusted at a higher temperature produced by the exothermic reaction, thereby performing the active regeneration of the DPF.

Figure 3:
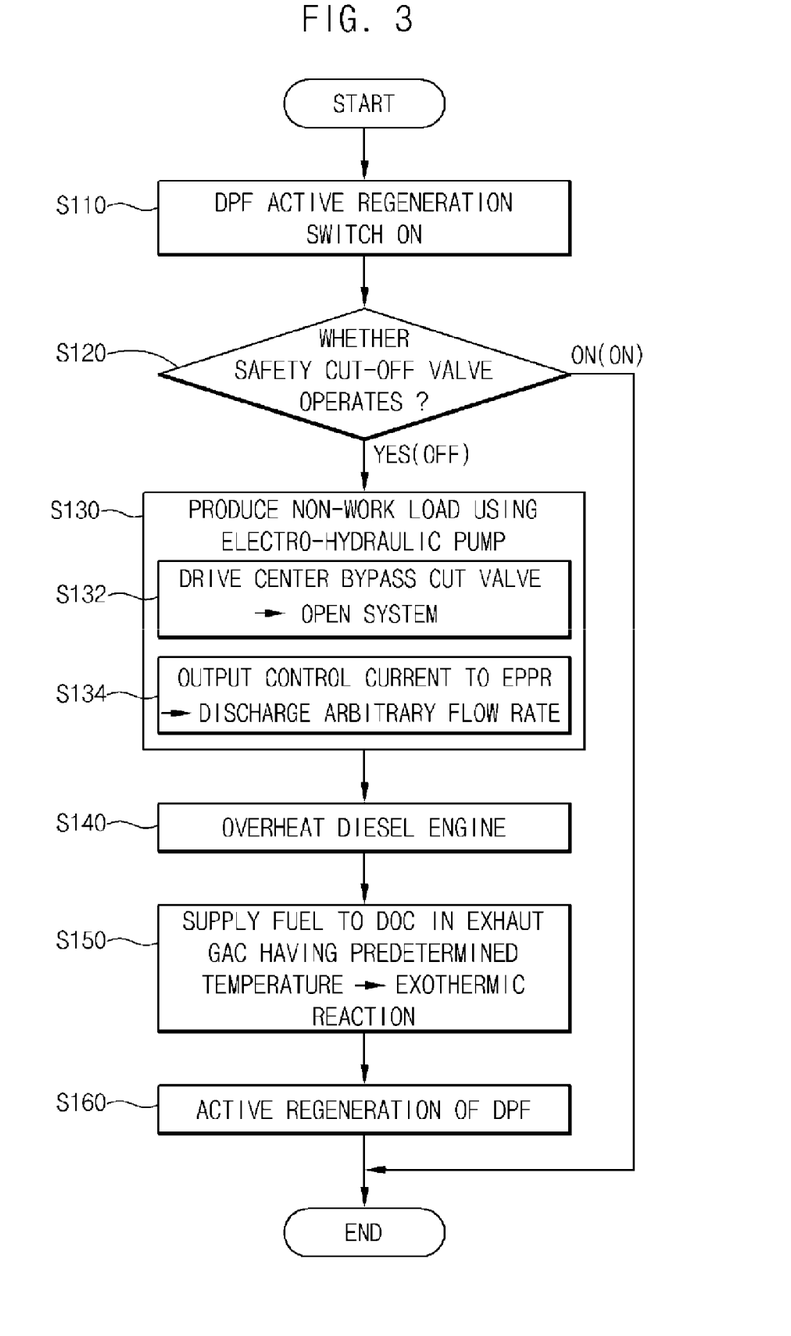
FIG. 3 is a flowchart illustrating an exemplary procedure in which the system of FIG. 2 is operated.
Figure 4:
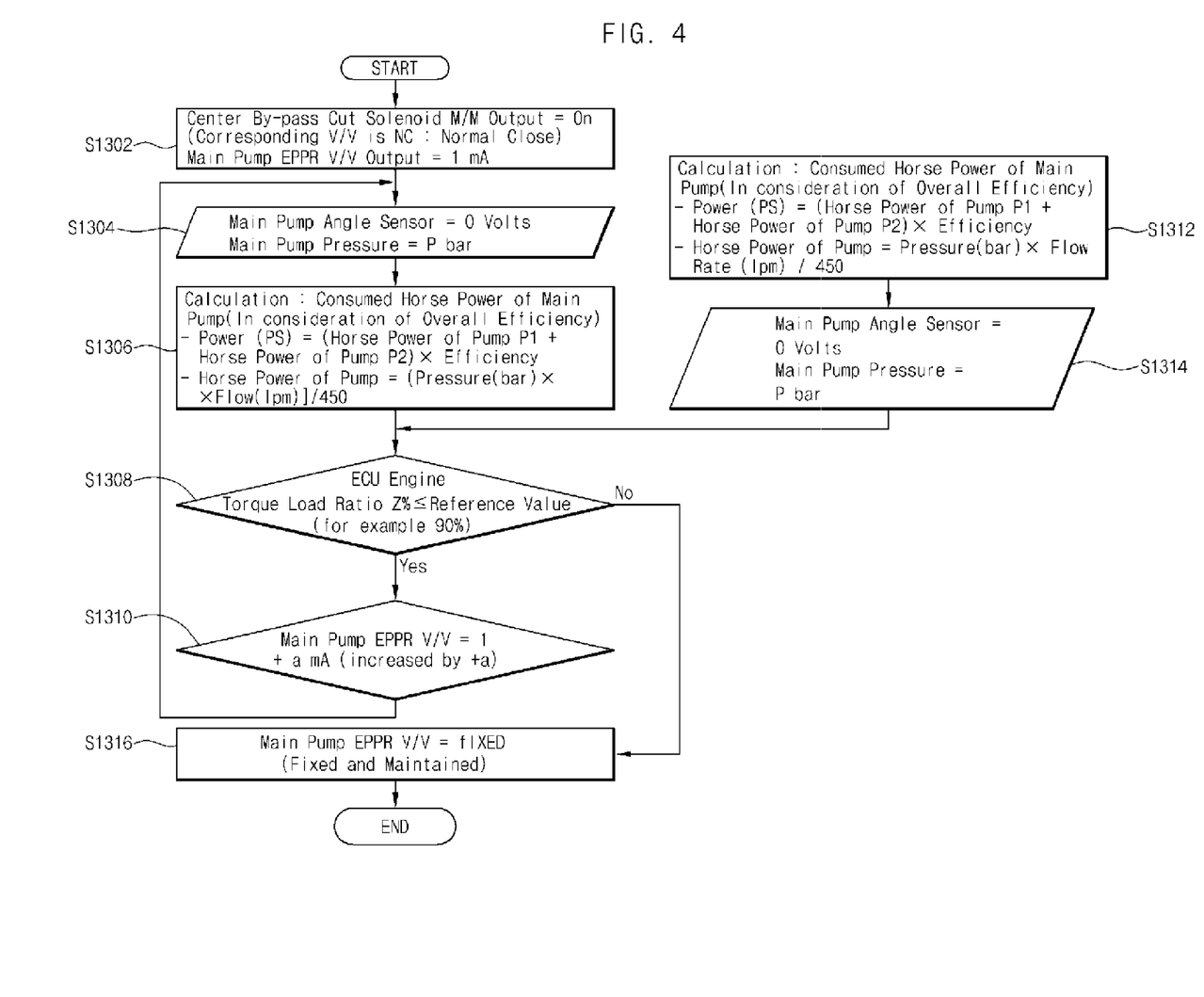
FIG. 4 is a flowchart illustrating an example of control logic for producing a non-work load.

Hereinafter, a procedure in which the active regeneration of the DPF is performed in the aforementioned system will be described. FIG. 3 is a flowchart illustrating an exemplary procedure in which the system of FIG. 2 is operated, and FIG. 4 is a flowchart illustrating an example of control logic for producing a non-work load. Referring to the drawings, a procedure in which the active regeneration of the DPF according to an exemplary embodiment of the present disclosure is performed will be confirmed.

According to FIG. 3, a method for active regeneration of a DPF according to the exemplary embodiment of the present disclosure starts, for example, from step S110 of receiving an instruction of the operator on the active regeneration of the DPF by operating the DPF active regeneration switch S to be turned ON.

Before performing the active regeneration, step of confirming whether the safety cut-off valve is operated to be in the OFF state proceeds (S120). The above step corresponds to a procedure of confirming whether the start condition for performing the active regeneration of the DPF is satisfied as described above. If the active regeneration of the DPF is selected and simultaneously the safety cut-off valve 62 is automatically turned OFF by control of the controller 50, step S120 may be omitted. In addition, in a case of an electro-hydraulic system in which the safety cut-off valve 62 is omitted, and the controller 50 receives the work instruction applied from the lever 60 so as to control each of the main control valves 30, even though the work signal is generated by an erroneous operation of the lever 60 by the operator when the active regeneration of the DPF proceeds, the controller 50 disregards the above process and does not drive the main control valve 30, and thereby step S120 may be omitted.

If the safety cut-off valve is not in the OFF state but in the ON state, the procedure ends. Whether the safety cut-off valve is operated, as described above, is determined to prevent sudden damage to the engine due to a mistake or an erroneous operation of the operator when the active regeneration of the DPF is performed, and it is preferred that the active regeneration of the DPF is necessarily performed under a condition in which the safety cut-off valve is driven in the OFF state.

Meanwhile, after it is confirmed that the safety cut-off valve is operated in the OFF state, the procedure proceeds to step S130 of producing a non-work load by the electro-hydraulic pump. Here, in order for the system of an exemplary embodiment of the present disclosure to convert from a typical hermetic state to an open state, for example, the center bypass cut valve is driven in an open state (step S132), and thereafter, an arbitrary control current is applied to the electromagnetic proportional control valve (EPPR) in a state in which the system is opened such that the EPPR adjusts an angle of the swash plate of the corresponding electro-hydraulic pump, and the working fluid may be discharged from the electro-hydraulic pump at an arbitrary flow rate (step S134).

The working fluid is collected in the tank through the opened center bypass line 80, and thereby flows by bypassing the working machine, and may cause a non-work load in a state in which the working machine is not substantially driven. An example in respect to details of a control current applied to the EPPR will be described below with reference to FIG. 4.

Thereafter, the diesel engine, which receives a non-work load, is overheated (step S140), and a temperature of high-temperature exhaust gas discharged from the overheated diesel engine reaches a predetermined temperature.

Here, the predetermined temperature refers to a temperature that may cause an exothermic reaction between the diesel oxidation catalyst (DOC) through which the exhaust gas passes thereafter and fuel supplied thereto. That is, when the exhaust gas, which is heated to a predetermined temperature, passes through the diesel oxidation catalyst (DOC), and at this time, fuel is supplied to the DOC, an exothermic reaction occurs between the DOC and the supplied fuel (step S150).

While the exhaust gas is heated up to a higher temperature by the exothermic reaction, and the heated exhaust gas passes through the diesel particulate filter (DPF) disposed at the rear end of the DOC, particulates (soot) and the like trapped in the DPF are removed by being combusted such that the active regeneration of the DPF is performed (step S160).

Thereafter, when the aforementioned predetermined end condition is satisfied, the active regeneration of the DPF ends.

Next, a process of producing an arbitrary non-work load in the electro-hydraulic pump in accordance with characteristics of an exemplary embodiment of the present disclosure will be exemplarily described with reference to FIG. 4. For reference, a load (torque) of the electro-hydraulic pump needs to be produced to match with a required heating value of the engine, that is, a heating value of the engine which is required to raise a temperature of the exhaust gas up to a predetermined temperature.

As exemplarily described in step S1302, the center bypass cut valve is operated by driving the center bypass cut solenoid valve. The solenoid valve ordinarily maintains a state in which the center bypass cut valve is closed, and may have a form that opens the center bypass cut valve when the solenoid valve is driven (for example, NC; normal close). In addition, in this step, an arbitrary control current, for example, I mA is applied to a electromagnetic proportional control (EPPR). Here, the I means an initial value that is arbitrarily set.

Next, as exemplarily described in step S1304, an angle of the swash plate of the electro-hydraulic pump is maintained as an initial value (for example, an angle corresponding to 0 volt that is a measurement value of each of the sensors), and pressure in the electro-hydraulic pump is maintained as P bar.

Next, as exemplarily described in step S1306, consumed horse power (in consideration of the overall efficiency) is calculated with respect to the electro-hydraulic pump as follows.

$$\text{Power (PS)} = (\text{horse power of pump } P1 + \text{horse power of pump } P2) \times \text{efficiency}$$

$$\text{Horse power of pump} = \text{pressure (bar)} \times \text{flow rate (lpm)}/450$$

Here, P1 and P2 indicate one of a pair of electro-hydraulic pumps disposed at left and right sides, respectively, and the Power means consumed horse power.

In addition, as exemplarily described in step S1312 in parallel to the aforementioned description, arbitrary set values with respect to the active regeneration of the DPF are presented by the ECU of the diesel engine.

For example, torque that is required to perform the active regeneration of the DPF, and an ECU engine torque load ratio are suggested as a predetermined reference value, respectively, and "torque" and an rpm value are set as a reference value so as to match with required torque. Here, a reference value in respect to an engine torque load ratio is suggested as about 90%. Here, the engine torque load ratio may be a reference to allow the engine to be stably driven by preventing the electro-hydraulic pump from exceeding an arbitrary torque load ratio.

Next, in step S1314, an engine torque load ratio is determined as Z % by the ECU of the diesel engine.

Now, in step S1308, it is determined whether the engine torque load ratio (Z %) obtained from the ECU is equal to or less than a reference value (for example, 90%). If the engine torque load ratio (Z %) is equal to or less than the reference value (for example, 90%), as exemplarily described in step S1310, a value of the control current applied to the electromagnetic proportional control valve (EPPR) is increased from I mA to (I+a) mA, that is, increased by a mA so as to increase the discharge flow rate of the electro-hydraulic pumps 12a and 12b, and thereafter, the procedure proceeds to step S1304 such that the succeeding step is repeatedly and continuously performed.

If the engine torque load ratio (Z %) exceeds the reference value (for example, 90%), as exemplarily described in step S1316, the EPPR adjusts an angle of the swash plate of the corresponding electro-hydraulic pump based on a final control current value (for example, (I+a) mA) so as to discharge the working fluid at the corresponding flow rate. Here, it is preferred that the electro-hydraulic pumps 12a and 12b discharge the working fluid at a maximum flow rate within a range that the engine torque load ratio allows so as to quickly achieve the condition for active regeneration, thereby improving fuel efficiency and saving time.

As such, the EPPR discharges the working fluid at the corresponding flow rate by adjusting an angle of the swash plate of the electro-hydraulic pump based on an arbitrary control current value that is determined through a predetermined procedure, thereby producing the corresponding non-work load.

A flowchart of FIG. 4 is exemplarily described for explaining characteristics of an exemplary embodiment of the present disclosure, and it is obvious that the present disclosure is not limited thereto. That is, under a precondition in which an arbitrary control current is applied to the EPPR, and the EPPR adjusts an angle of the swash plate of the electro-hydraulic pump based on the arbitrary control current, thereby discharging the working fluid at a predetermined flow rate, it is obvious that an exemplary embodiment of the present disclosure may be arbitrarily altered or modified.

As described above, an exemplary embodiment of the present disclosure suggests the system and the method for performing the active regeneration of the DPF in a case of the construction machine having the electro-hydraulic pump. For example, by performing a step of confirming whether the safety cut-off valve is driven in the OFF state as the start condition for the active regeneration of the DPF when the operator makes an instruction for starting the active regeneration of the DPF, an exemplary embodiment of the present disclosure may prevent a drive of the working machine by a mistake or an erroneous operation of the operator when performing the active regeneration of the DPF, thereby preventing damage to the engine, which is performing the regeneration of the DPF, due to a drive of the working machine.

In addition, in accordance with characteristics of the electro-hydraulic pump that is typically operated in a hermetic system, a step of opening the center bypass line by driving the center bypass cut valve is performed in order to convert the system to an open type. As such, in a state in which the system is opened, the electro-hydraulic pump is operated so as to discharge the working fluid at a predetermined flow rate, thereby producing a non-work load. Specifically, the adjustor such as the electromagnetic proportional control valve (EPPR) is connected to the electro-hydraulic pump, and the control current of a predetermined value is applied to the EPPR, thereby adjusting a discharge flow rate by adjusting an angle of the swash plate in the electro-hydraulic pump.

Thereafter, the diesel engine is overheated by the produced non-work load, a temperature of the exhaust gas is raised by the overheated engine up to a predetermined temperature that is required for an exothermic reaction (catalytic reaction) between the DOC and fuel, and the exhaust gas, which is heated to a higher temperature by the exothermic reaction, combusts and removes particulates (soot) and the like trapped in the DPF, thereby performing the active regeneration of the DPF.

Lastly, when the ECU receives a DPF regeneration completion signal, or the operator intentionally performs an operation of ending the active regeneration of the DPF, the active regeneration of the DPF ends.

By the system and the method as described above, the active regeneration of the DPF may be performed through an easy and preferable procedure in the construction machine provided with the hydraulic system including the electro-hydraulic pump.

A non-work load is produced so as to perform active regeneration of the DPF such that a time needed for the engine to be overheated to a predetermined temperature is accelerated, thereby greatly reducing a time that is actually needed to perform the regeneration of the DPF. Hereby, because an amount of fuel (for example, a sum of fuel used for driving the diesel engine and fuel supplied to the DOC), which is consumed for the active regeneration of the DPF, is substantially reduced, thereby reducing costs.

In addition, by utilizing a safety device such as the safety cut-off valve, damage to the engine or the like, which may occur when performing the active regeneration of the DPF, may be prevented.

According to an exemplary embodiment of the present disclosure, it is possible to provide the system and the method for performing active regeneration of the DPF with respect to the construction machine having the electro-hydraulic pump.

In addition, according to an exemplary embodiment of the present disclosure, the diesel engine quickly discharges high-temperature exhaust gas by receiving a non-work load such that the high-temperature exhaust gas may cause an exothermic reaction with the DOC so as to combust particulates trapped in the DPF.

In addition, according to an exemplary embodiment of the present disclosure, the active regeneration of the DPF is quickly performed such that an amount of fuel, which is consumed in respect to the active regeneration, may be minimized.

Although the present disclosure has been described with reference to exemplary and preferred embodiments, workers skilled in the art will recognize that changes may be made in form and detail without departing from the spirit and scope of the disclosure.

The invention claimed is:

1. A system for active regeneration of a DPF of a construction machine having an electro-hydraulic pump, the system comprising:
   a diesel engine;
   electro-hydraulic pumps driven by the diesel engine and of which a discharge flow rate is adjusted by a current control of a controller;
   a plurality of working machines driven by working fluid discharged from the electro-hydraulic pumps;
   a center bypass line having one end connected to the electro-hydraulic pumps, and the other end connected to a tank, so that the working fluid discharged from the electro-hydraulic pumps returns back to the tank when the plurality of working machine is not driven;
   center bypass cut valves which selectively block connection between the center bypass line and the tank;
   a diesel particulate filter (DPF) which filters contaminants from exhaust gas discharged from the diesel engine; and
   a DPF regeneration means including a diesel oxidation catalyst (DOC) which causes an exothermic reaction with fuel at a predetermined temperature,
   wherein the controller produces a non-work load by increasing a discharge flow rate of the electro-hydraulic pumps without driving the working machines in a state in which the center bypass line is connected to the tank by driving the center bypass cut valves when performing active regeneration of the DPF, and allows a temperature of the exhaust gas to be raised up to the predetermined temperature by increasing a heating value of the diesel engine by the non-work load.

2. The system of claim 1, wherein the hydraulic system further includes a safety cut-off valve which is disposed on a path which transmits pilot pressure which instructs a drive of each of the working machines, and configured to block the transmission of the pilot pressure when the safety cut-off valve is operated, and the safety cut-off valve is operated when the regeneration of the DPF starts so as to block the transmission of the pilot pressure, and released after the regeneration of the DPF is completed so as to enable the transmission of the pilot pressure.

3. A method for active regeneration of a DPF of a construction machine having an electro-hydraulic pump in the system for active regeneration of the DPF according to claim 2, the method comprising:
   a) receiving instruction on the active regeneration of the DPF;
   b) adjusting the electro-hydraulic pump so that the corresponding electro-hydraulic pump discharges the working fluid at a predetermined flow rate by opening the system by driving the center bypass cut valve, and providing an arbitrary control current to the electromagnetic proportional control valve (EPPR);
   c) overheating the diesel engine by a non-work load generated by the discharge of the working fluid from the electro-hydraulic pump; and
   d) performing the active regeneration of the DPF by causing an exothermic reaction by supplying fuel to a diesel oxidation catalyst (DOC) disposed on a path through which the exhaust gas heated to a predetermined temperature is discharged.

4. The method of claim 3, wherein the system for active regeneration of the DPF includes a main control valve which is driven according to transmission of a work instruction of an operator, and drives each of the working machines, and step b) is performed only when the work instruction, which is transmitted to the main control valve, is in a state of being blocked.

5. The system of claim 1, wherein a discharge flow rate of the electro-hydraulic pumps is controlled based on a control current received through electromagnetic proportional control valves (EPPR).

6. A method for active regeneration of a DPF of a construction machine having an electro-hydraulic pump in the system for active regeneration of the DPF according to claim 5, the method comprising:
   a) receiving instruction on the active regeneration of the DPF;
   b) adjusting the electro-hydraulic pump so that the corresponding electro-hydraulic pump discharges the working fluid at a predetermined flow rate by opening the system by driving the center bypass cut valve, and providing an arbitrary control current to the electromagnetic proportional control valve (EPPR);
   c) overheating the diesel engine by a non-work load generated by the discharge of the working fluid from the electro-hydraulic pump; and
   d) performing the active regeneration of the DPF by causing an exothermic reaction by supplying fuel to a diesel oxidation catalyst (DOC) disposed on a path through which the exhaust gas heated to a predetermined temperature is discharged.

7. The method of claim 6, wherein the system for active regeneration of the DPF includes a main control valve which is driven according to transmission of a work instruction of an operator, and drives each of the working machines, and step b) is performed only when the work instruction, which is transmitted to the main control valve, is in a state of being blocked.

8. A method for active regeneration of a DPF of a construction machine having an electro-hydraulic pump in the system for active regeneration of the DPF according to claim 1, the method comprising:
   a) receiving instruction on the active regeneration of the DPF;
   b) adjusting the electro-hydraulic pump so that the corresponding electro-hydraulic pump discharges the working fluid at a predetermined flow rate by opening the system by driving the center bypass cut valve, and providing an arbitrary control current to the electromagnetic proportional control valve (EPPR);
   c) overheating the diesel engine by a non-work load generated by the discharge of the working fluid from the electro-hydraulic pump; and
   d) performing the active regeneration of the DPF by causing an exothermic reaction by supplying fuel to a diesel oxidation catalyst (DOC) disposed on a path through which the exhaust gas heated to a predetermined temperature is discharged.

9. The method of claim 8, wherein the system for active regeneration of the DPF includes a main control valve which is driven according to transmission of a work instruction of an operator, and drives each of the working machines, and step b) is performed only when the work instruction, which is transmitted to the main control valve, is in a state of being blocked.

* * * * *